(12) United States Patent
De Sandro et al.

(10) Patent No.: US 7,046,902 B2
(45) Date of Patent: May 16, 2006

(54) LARGE MODE FIELD DIAMETER OPTICAL FIBER

(75) Inventors: Jean-Philippe De Sandro, Sillery (CA); Stephane Chatigny, St-Redempteur (CA); Eric Gagnon, Stoneham (CA); François Chenard, Ste-Foy (CA)

(73) Assignee: CorActive High-Tech Inc., Quebec (CA)

( * ) Notice: Subject to any disclaimer, the term of this patent is extended or adjusted under 35 U.S.C. 154(b) by 228 days.

(21) Appl. No.: 10/673,225

(22) Filed: Sep. 30, 2003

(65) Prior Publication Data

US 2005/0069270 A1    Mar. 31, 2005

(51) Int. Cl.
*G02B 6/02* (2006.01)
(52) U.S. Cl. .................................. 385/142; 385/127
(58) Field of Classification Search ................ 385/123, 385/124, 126, 127, 141, 142
See application file for complete search history.

(56) References Cited

U.S. PATENT DOCUMENTS

| | | | |
|---|---|---|---|
| 4,923,279 A | 5/1990 | Ainslie et al. | |
| 5,005,175 A | 4/1991 | Desurvire et al. | |
| 5,131,069 A | 7/1992 | Hall et al. | |
| 5,155,621 A | 10/1992 | Takeda et al. | |
| 5,262,365 A | 11/1993 | Oyobe et al. | |
| 5,278,850 A | 1/1994 | Ainslie et al. | |
| 5,467,218 A | 11/1995 | Takeda et al. | |
| 5,703,987 A | 12/1997 | Imoto | |
| 5,937,134 A | 8/1999 | DiGiovanni | |
| 6,463,201 B1 | 10/2002 | Aiso et al. | |
| 2004/0042759 A1* | 3/2004 | Park et al. | 385/142 |

OTHER PUBLICATIONS

Proposed Fiber Cavities for Optical Masers—E. Snitzer J. Appl. Phys., vol. 32, pp. 36-39 (1961).
Loss Analysis of Single-Mode Fiber Splices—D. Marcuse Bell System Tech. J., vol. 56, pp. 703-718 (1977).

* cited by examiner

Primary Examiner—Sarah Song
(74) Attorney, Agent, or Firm—George J. Primak

(57) ABSTRACT

A large mode field diameter optical fiber is disclosed. It is a single mode optical fiber which has a core and a cladding. The core of this fiber has two regions, an inner core region and an outer core region which has a refractive index lower than that of the inner core region. The inner core region is doped with a rare-earth element, such as $Er_2O_3$, and a co-dopant, such as $Al_2O_3$, and the outer core region is doped with a dopant such as $GeO_2$. The types and amounts of the dopants and co-dopants are adjusted to obtain a fiber with a mode field diameter greater than 5.5 μm at a wavelength of 1550 nm.

12 Claims, 3 Drawing Sheets

LARGE MODE FIELD DIAMETER OPTICAL FIBER

BACKGROUND OF THE INVENTION

1. Field of the Invention

This invention relates to large mode field diameter optical fibers suitable for use in fiber lasers and amplifiers. More particularly, the invention relates to rare-earth doped optical fibers that have a large mode field diameter which is needed to insure low splice loss between component fibers and standard single mode fibers in doped fiber amplifiers (DFA) and fiber lasers.

2. Description of the Prior Art

Rare earths have been used as dopants of choice for the realization of fiber lasers and amplifiers since the first demonstration of gain in an Nd doped glass fiber, described by E. Snitzer, J. Appl. Phys. Vol.32, pp.36–39 (1961). In the telecommunications area, the invention of the erbium doped fiber amplifier (EDFA) revolutionized the design of optical communications systems. But erbium doped amplifying fiber characteristics have a major impact on the EDFA performance. Since the invention of the EDFA in the late 1980's, many erbium doped fiber designs have been developed to optimize EDFA performance. As there are different kinds of EDFA (pre-amplifier, booster amplifier, in-line amplifier, and the like) with different ranges of operating conditions, various fibers have been developed to accommodate specific needs.

However, there are common features inherent to the nature of the silica glass used as host of the majority of these fibers. All require a significant amount of aluminium to provide a broad emission spectrum and allow simultaneous amplification of a large number of wavelengths for DWDM applications. Aluminium also offers the advantage of reducing the tendency of the erbium atoms to cluster in the silica matrix, as clustering leads to the degradation of the amplifier performance. Moreover, aluminium increases the index of refraction of the core glass, thereby providing these fibers with a higher numerical aperture (0.18–0.3) than that of standard single mode fiber (SMF). High numerical aperture erbium doped fibers (EDF) can also be desirable because they have been shown to provide optimum gain efficiency in the EDFA. In order to preserve the single mode operation at both the pump (around 980 nm) and signal (around 1550 nm) wavelengths, EDFs have a small core size (typically 3–4 microns in diameter) and exhibit reduced mode field diameters (typically 4–5.5 microns at 1550 nm compared to 10 microns in a standard single mode fiber). This makes them difficult to splice and is a major source of loss, degrading the performance of the EDFA.

To increase the core diameter of a fiber laser, U.S. Pat. No. 5,937,134 proposes a composition of the core that, in addition to rare-earth has Ge, Al and P dopants and further has two cladding layers with the difference between the refractive index of the core and the first cladding layer being less than 0.008. This patent, however, appears to be restricted to cladding pumped fiber lasers and there is clearly a need for a large mode field diameter fiber that could be used not only in lasers but also in DFA and would allow the DFA designer and manufacturer to fabricate an amplifier with high efficiency and reduced noise level.

SUMMARY OF THE INVENTION

The invention provides a single mode optical fiber with a large mode field diameter, said fiber having a core and a cladding, and the core of the fiber has an inner core region at least partially doped with a rare-earth dopant and a co-dopant and an outer core region at least partially doped with a dopant, the type and amount of the rare-earth dopant and its co-dopant in the inner core region and of the dopant in the outer core region being adapted to achieve a refractive index in the outer core region which is lower than that of the inner core region so as to produce a large mode field diameter of the fiber, exceeding 5.51 µm at a wavelength of 1550 nm.

Thus, the present invention resides in the finding that by subdividing the core profile of a rare-earth doped optical fiber into an inner core region and an outer core region and, with the use of index raising elements, adjusting the refractive index of the outer core region to be lower than the refractive index of the inner core region, one can obtain a fiber with a large mode field diameter exceeding 5.5 µm at 1550 nm. This mode field diameter is always larger than the mode field diameter of an equivalent rare-earth doped step index fiber having a single core profile.

Moreover, the outer core region may itself be composed of a plurality of sub-regions. For example, it may consist of 1 to 5 regions, each of which may have a different refractive index, provided, however, that the overall effective refractive index of the outer region is lower than that of the inner core region so as to achieve the desired large mode field diameter of the fiber.

The ratio of the diameter of the inner core region to the total core diameter is normally greater than 0.1, and preferably in the range from about 0.5 to 0.9.

The relative refractive index of the inner core region is normally from about 0.3% to 3% and that of the outer core region from about 0.2% to 2.9%. Thus, the refractive index of the outer core is always lower than that of the inner core region and is so adjusted as to produce the desired large mode field diameter. As is known, when expressed in percent, the relative refractive index is calculated as $\Delta n/n \times 100$, where $\Delta n$ is the difference between the index of the doped core region and that of silica and n is the refractive index of silica.

The inner core region of the fiber in accordance with the present invention is doped at least in part with a rare-earth element such as an oxide of Er, Yb, Nd, Th, Tm or a combination thereof. Preferably, it is doped with $Er_2O_3$. The rare-earth dopant is normally present in the molar amount from 10 ppm to 50,000 ppm, depending on the rare-earth element or combination being used. In addition, it has a co-dopant which may be an index raising element, such as an oxide of Al, La, P, Ge, Ti or a combination thereof. Preferably, the co-dopant in the inner core region is $Al_2O_3$. Such co-dopant is usually present within the range of 1 mol % to 40 mol %.

The outer core region will normally comprise only a dopant that is composed of index raising elements which may be the same or different from those used in the inner core region, but in an amount such as to make the refractive index of the outer core region lower than that of the inner core region. Suitable outer core dopants are, for example, oxides of Al, Ge, Ti, P, La and combinations thereof. The preferred outer core dopant is $GeO_2$ and such dopants are normally used within the range of 3 mol % to 20 mol %.

As already mentioned, the outer core region may be formed of a plurality of sub-regions which are doped, at least in part, with index raising elements so that the overall outer core region has a refractive index lower than that of the inner core region. One or more of such sub-regions may have no dopants at all and be made-up of pure silica. Preferably, the outer core region has 1 to 5 regions within its profile.

The cladding is usually made of pure silica, but it may also include dopants, if desired. However, the cladding layer in this invention does not contribute to the large field diameter formation of the fiber, which is produced by the dual core profile as described above.

The optical fiber of the present invention can be fabricated by any suitable method such as VAD, MCVD or OVD, PCVD or a combination thereof or any other method used to fabricate optical fiber. The preferred method is MCVD.

DETAILED DESCRIPTION OF THE INVENTION

Preferred embodiments of the invention will now be described with reference to the appended drawings.

Figure 1:
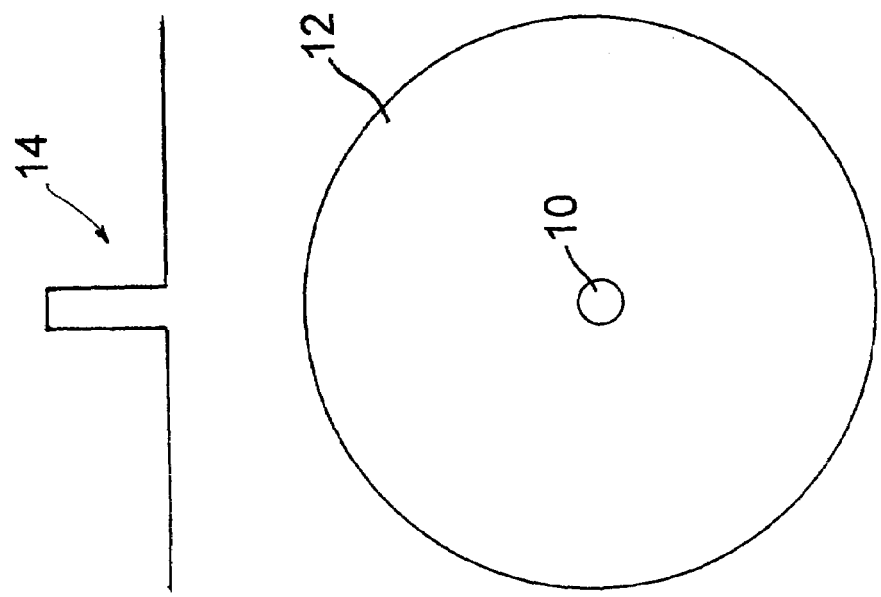
FIG. 1 illustrates the prior art profile of a step index single mode optical fiber on top of which there is shown the profile of its refractive index.

FIG. 1 illustrates a prior art step index fiber profile which comprises a core 10 and a cladding 12. The core 10 is normally erbium doped and may have index raising co-dopants, such as $Al_2O_3$, $La_2O_3$ and $GeO_2$. The cladding 12 is normally a pure silica cladding. This type of fiber produces a step index 14 and a mode field diameter (MFD) which is usually between 4 µm and 5.5 µm at 1550 nm wavelength.

Figure 2:
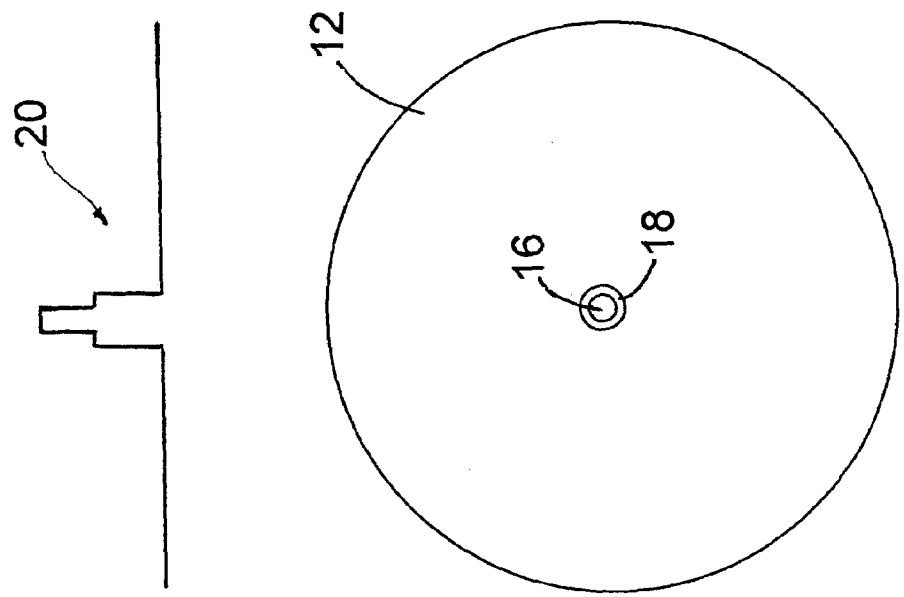
FIG. 2 illustrates the profile of a single mode optical fiber with large mode field diameter, in accordance with one embodiment of the present invention, on top of which there is shown its refractive index profile in a general schematic outline.

FIG. 2 illustrates an embodiment of a fiber profile in accordance with the present invention, also referred to as the CorActive fiber. It has a core formed of two regions 16 and 18. The inner core region 16 is normally doped, at least in part, with a rare-earth element such as erbium and has an index raising co-dopant such as $Al_2O_3$. The outer core region 18 is normally doped, at least in part, with an index raising dopant such as $GeO_2$. The amounts of dopants and co-dopants are adjusted so as to make the refractive index of the outer core region 18 lower than that of the inner core region 16. Cladding 12 is usually made of pure silica. The refractive index 20 graphically illustrates this profile which produces a large mode field diameter above 5.5 µm at 1550 nm wavelength.

Figure 3:
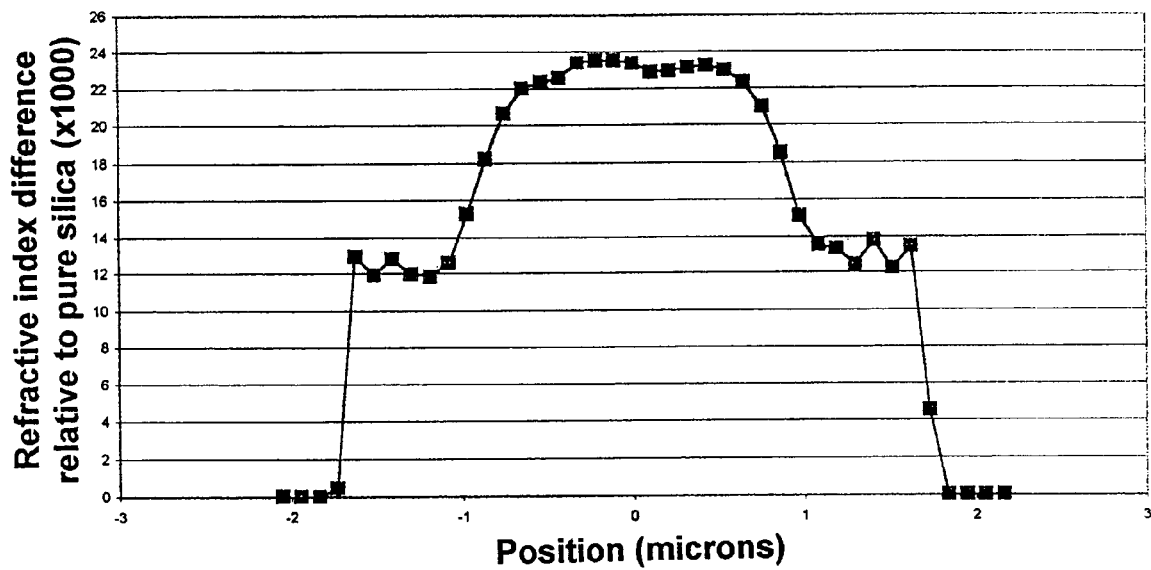
FIG. 3 shows the profile of the refractive index in a fiber of the present invention according to an actual example.
Figure 4:
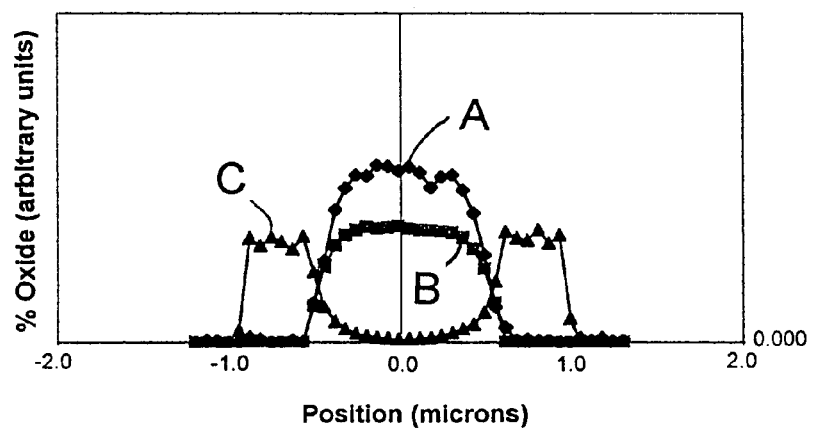
FIG. 4 graphically illustrates the distribution of the dopants in the fiber of the present invention that produce the refractive index profile of FIG. 3.

FIG. 3 shows the refractive index profile as it is actually produced in the dual core of the fiber of the present invention, and FIG. 4 shows the distribution by percentage of the dopants, in this case: A—$Er_2O_3$, B—$Al_2O_3$ and C—$GeO_2$, within the dual core that achieves such refractive index profile. The data obtained for these figures were taken from Example 1 described further below in this disclosure. The mode field diameter of such fiber was measured to be 6.6 µm at 1550 nm.

By comparison, an equivalent step index fiber, such as shown in FIG. 1, made with an index difference relative to the cladding of $23 \times 10^{-3}$ across the whole core, with a similar cut-of wavelength of 950 nm, would have a mode field diameter at 1550 nm that can be estimated from the following formula:

$$MFD = a \times \left(0.65 + \frac{1.619}{V^{3/2}} + \frac{2.879}{V^6}\right) \quad (1)$$

where a is the fiber radius and V the number defined by $$V = \frac{2\pi a \times N.A}{\lambda}$$

where $\pi$ is the wavelength of use and N.A. is the numerical aperture of the fiber defined as $N.A.=\sqrt{n_{core}^2 - n_{cladding}^2}$ where $n_{core}$ is the refractive index of the core of the fiber and $n_{cladding}$ the refractive index of the cladding.

It is then possible to estimate the MFD value at 1.55 microns for a step index fiber with a given index difference $\Delta n = n_{core} - n_{cladding}$ coming from the core index raising elements. One can also express it as relative refractive index given by $\Delta n / n_{core}$. Based on equation (1), this would lead to a value of 5.17 µm for an equivalent step index fiber with a core to cladding index difference of $23 \times 10^{-3}$ and a 950 nm cutoff. Thus, the fiber of the present invention, as described with reference to FIGS. 2, 3 and 4, provides a relative improvement of about 30% on the mode filed diameter, that translates into lower splice losses.

To evaluate the advantage of the CorActive fiber structure over a wider range of numerical apertures, one can use the following approximation for a ratio of inner core to outer core of 0.5:

$$N.A. = \sqrt{\left(\frac{n_{inner\ core} - n_{outer\ core}}{2} + n_{outer\ core}\right)^2 - n_{cladding}^2} \quad (2)$$

where $n_{inner\ core}$ is the refractive index of the inner core and $n_{outer\ core}$ is the refractive index of the outer core.

It is then possible to estimate the difference of mode field diameters for two fibers having the same maximum index difference: but one having a standard step index core, and the other having an index difference between the inner core and the cladding twice as large as the difference between the outer core and the cladding. The N.A. of the later can then be estimated by the following formula:

$$N.A. = \sqrt{\left(\frac{n_{cladding} + 3 \times n_{inner\ core}}{4}\right)^2 - n_{cladding}^2} \quad (3)$$

Figure 5:
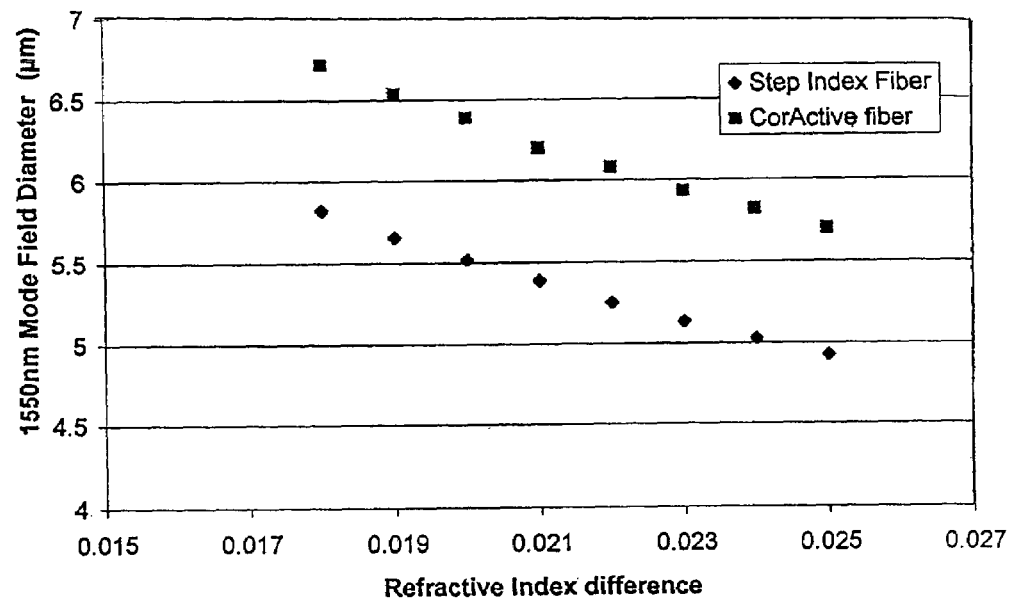
FIG. 5 shows a plot comparing mode field diameters at 1550 nm wavelength for a range of index differences.

Thus, FIG. 5 provides a graph showing the mode field diameters for different values of refractive index difference between the CorActive fiber described above of the present invention and the known step index fiber, both using pure silica cladding and both having a 950 nm cut-off. This graph shows that the advantage of the CorActive fiber prevails over a wide range of index differences.

Figure 6:
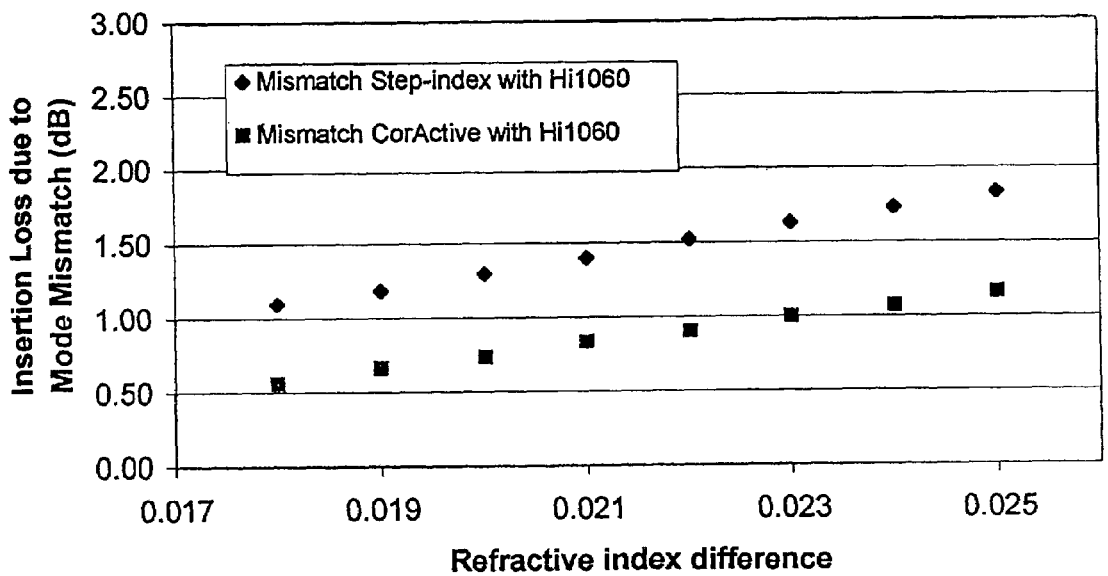
FIG. 6 shows a plot comparing mode mismatch when splicing the step index fiber and the CorActive fiber of the present invention with Hi1060 fiber.

This difference in mode field diameters shown in FIG. 5 translates into a loss due to the mode field diameter mismatch when the fiber has to be spliced to a component fiber. The loss due to mode mismatch can be evaluated theoretically as disclosed by D. Marcuse, Bell Syst.Tech.J., Vol. 56, pp. 703–718, (1977) and the evaluation of the mode mismatch of the two fibers is shown in FIG. 6 for different values of the inner refractive index difference. The difference has been found to be typically 0.5 to 0.7 dB and becomes more pronounced for high N.A. fiber.

Although splicing recipes can be developed for each fiber to minimize the splice loss resulting from the mode mismatch, the fiber with a lower mode mismatch will exhibit lower splice losses and show more consistency and repeatability in EDFA manufacturing, resulting in higher efficiency and lower noise figure.

The invention will now be further described by means of the following non-limitative examples.

EXAMPLE 1

A single mode CorActive erbium doped fiber (EDF) was made by a combination of MCVD process and solution doping. The core of the fiber was composed of two adjacent regions, the inner core region and the outer core region. The inner core region was formed of silica glass and was doped with $Er_2O_3$ in the amount of 500 ppm and co-doped with $Al_2O_3$ in the amount of 10 mol %. The outer core region was formed of silica/germania glass with $GeO_2$ in the amount of 8.5 mol %. The core was provided with a cladding made of pure silica. The distribution of the different dopants concentrations measured across the core was as shown in FIG. 4.

The diameter of the cladding of the fiber made from the above cane was 125 μm and the resulting diameter of the core was 3.3 μm. The diameter of the inner core was 1.7 μm. The relative step refractive index between the outer core and the cladding was $12\times10^{-3}$. The relative step refractive index between the inner core and the cladding was $23\times10^{-3}$. The mode field diameter (MFD) of such fiber at 1550 nm wavelength was measured to be 6.1 μm.

EXAMPLE 2

A known single mode step index erbium doped fiber (EDF) was made by a combination of MCVD process and solution doping. The core of the fiber was of uniform composition formed of silica/germania glass with $GeO_2$ in the amount of 8.5 mol % and was doped with $Er_2O_3$ in the amount of 500 ppm and co-doped with $Al_2O_3$ in the amount of 10 mol %. The core was provided with a cladding made of pure silica. The diameter of the cladding was 125 μm and that of the core 3.3 μm. The relative step refractive index between the core and the cladding was of $23\times10^{-3}$. The mode field diameter of such fiber at 1550 nm wavelength was measured to be 5.35 μm.

From the above examples, one obtains an MFD improvement from the CorActive fiber of 14% which results in splice loss improvement when the fibers are spliced with Hi1060 of 30–40% which is a very significant improvement.

Thus, the CorActive fiber design allows the incorporation of high levels of index raising dopants (for example aluminum in an erbium doped fiber) without the disadvantage of producing a very small core fiber and hence reduced mode field diameter leading to higher splice loss.

The invention is not limited to the specific embodiments described above, but includes various modifications obvious to those skilled in the art.

The invention claimed is:

1. A large mode field diameter optical fiber which is a single mode fiber having a core and a cladding and wherein the core has an inner core region, at least partially doped with a rare-earth dopant and a co-dopant, and an outer core region at least partially doped with a dopant, the type and amount of the rare-earth dopant and its co-dopant in the inner core region and of the dopant in the outer core region being adapted to achieve a refractive index in the outer core region that is lower than the refractive index of the inner core region so as to produce a large mode field diameter, exceeding 5.5 μm at a wavelength of 1550 nm.

2. An optical fiber according to claim 1, in which the outer core region includes a plurality of sub-regions each of which may have a different refractive index, provided that overall effective refractive index of the outer region is lower than the refractive index of the inner core region.

3. An optical fiber according to claim 2, in which the outer core region is made of up to five sub-regions.

4. An optical fiber according to claim 1, in which the ratio of the diameter of the inner core region to the total core region is greater than 0.1.

5. An optical fiber according to claim 4, in which the ratio of the diameter of the inner core region to the total core diameter is in the range from about 0.5 to 0.9.

6. An optical fiber according to claim 1, in which the relative refractive index of the inner core region is from about 0.3% to 3% and that of the outer core region is from about 0.2% to 2.9%.

7. An optical fiber according to claim 1, in which the rare-earth dopant is selected from oxides of Er, Yb, Nd, Th and Tm or a combination thereof, and is present in the inner core region in a molar amount of from 10 ppm to 50,000 ppm.

8. An optical fiber according to claim 7, in which said rare-earth dopant is $Er_2O_3$.

9. An optical fiber according to claim 1, in which the co-dopant is selected from oxides of Al, Ge, Ti, P and La or a combination thereof, and is present in the inner core region in an amount of from 1 mol% to 40 mol%.

10. An optical fiber according to claim 9, in which said co-dopant is $Al_2O_3$.

11. An optical fiber according to claim 1, in which the dopant in the outer core region is selected from oxides of Al, Ge, Ti, P and La or a combination thereof, and is present in an amount of 3 mol% to 20 mol%.

12. An optical fiber according to claim 11, in which said dopant is $GeO_2$.

* * * * *